US009734561B2

(12) United States Patent
Narumi et al.

(10) Patent No.: US 9,734,561 B2
(45) Date of Patent: Aug. 15, 2017

(54) IMAGE ENHANCEMENT BASED ON THE REFLECTANCE COMPONENT

(71) Applicant: FUJI XEROX CO., LTD., Tokyo (JP)

(72) Inventors: Shota Narumi, Kanagawa (JP); Makoto Sasaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/817,634

(22) Filed: Aug. 4, 2015

(65) Prior Publication Data

US 2016/0275654 A1 Sep. 22, 2016

(30) Foreign Application Priority Data

Mar. 19, 2015 (JP) .................................. 2015-056843

(51) Int. Cl.
  *G06T 5/00* (2006.01)
  *G06K 9/46* (2006.01)
(52) U.S. Cl.
  CPC ............ *G06T 5/002* (2013.01); *G06K 9/4661* (2013.01); *G06T 2207/10024* (2013.01)
(58) Field of Classification Search
  CPC . G06T 5/002; G06T 7/20; G06T 2207/10016; G06T 2207/30241
  USPC ......................................................... 382/274
  See application file for complete search history.

(56) References Cited

U.S. PATENT DOCUMENTS

| 7,590,303 B2* | 9/2009 | Lee .......................... G06T 5/008 382/260 |
| 8,358,876 B1* | 1/2013 | Gilra ...................... G06T 3/0012 345/418 |
| 2003/0016306 A1* | 1/2003 | Ogata ..................... G06T 5/007 348/671 |
| 2008/0002908 A1* | 1/2008 | Chinen ................... G06T 5/002 382/274 |

(Continued)

FOREIGN PATENT DOCUMENTS

| JP | 4345366 B2 | 10/2009 |
| JP | 2012-175310 A | 9/2012 |

OTHER PUBLICATIONS

Tu et al. ("Skin color detection by illumination estimation and normalization in shadow regions," IEEE International Conference on Information and Automation, Jun. 20-23, 2010).*

*Primary Examiner* — Yubin Hung
(74) *Attorney, Agent, or Firm* — Oliff PLC

(57) ABSTRACT

An image processing apparatus includes a smoothed-image generating unit that generates smoothed images obtained by smoothing an original image with degrees of smoothing, respectively, an illumination-image generating unit that generates an illumination image having pixel values of an illumination component of the original image by using the smoothed images that undergo weighting in which at least one of the smoothed images is assigned a different weight, a reflectance-image generating unit that generates a reflectance image on a basis of the original image and the illumination image, the reflectance image having pixel val- (Continued)

ues of a reflectance component of the original image, and a reproduced-image generating unit that generates a reproduced image to enhance visibility of the original image, at least on a basis of the reflectance image and degree-of-enhancement information indicating a degree of enhancement of the reflectance component of the original image.

7 Claims, 16 Drawing Sheets

(56) References Cited

U.S. PATENT DOCUMENTS

| | | | |
|---|---|---|---|
| 2008/0101719 A1* | 5/2008 | Lim | H04N 1/4072 382/274 |
| 2009/0059026 A1* | 3/2009 | Katagiri | H04N 19/40 348/222.1 |
| 2009/0080771 A1* | 3/2009 | Kamon | H04N 9/045 382/166 |
| 2009/0175558 A1* | 7/2009 | Moriya | H04N 1/387 382/279 |
| 2010/0066868 A1* | 3/2010 | Shohara | G06K 9/40 348/241 |
| 2012/0301050 A1* | 11/2012 | Wakazono | H04N 5/23229 382/274 |

* cited by examiner

σ = LOW

σ = MEDIUM

σ = HIGH

FIG. 6A

| 11 | 12 | 11 | 9 | 9 | 8 |
|----|----|----|---|---|---|
| 11 | 12 | 11 | 9 | 8 | 7 |
| 9  | 15 | 10 | 8 | 8 | 9 |
| 14 | 9  | 11 | 11| 9 |   |

FIG. 6B (σ = LOW)

| 19 | 18 | 17 | 16 | 16 |    |
| 18 | 17 | 16 | 15 | 14 |    |
| 17 | 16 | 16 | 15 | 14 | 13 |
| 16 | 16 | 15 | 14 | 14 |    |

FIG. 6C (σ = HIGH)

| 48 | 48 | 48 | 48 | 48 | 48 |
| 48 | 47 | 47 | 47 | 47 | 47 |
| 48 | 47 | 47 | 47 | 47 | 47 |
| 46 | 46 | 47 | 47 | 47 |    |

FIG. 6D

| 148 | 170 | 180 | 225 | 223 |     |
| 156 | 165 | 175 | 159 | 143 |     |
| 135 | 143 | 143 | 136 | 187 |     |
| 120 | 143 | 136 | 146 | 200 |     |
| 159 | 136 | 128 | 164 | 177 |     |

FIG. 6E

| 58 | 64 | 65 | 81 | 78 |    |
| 58 | 58 | 60 | 54 | 50 |    |
| 48 | 48 | 49 | 43 | 60 |    |
| 43 | 48 | 43 | 43 | 60 |    |
| 53 | 43 | 38 | 49 | 49 |    |

FIG. 8A

| 72 | 73 | 73 | 71 | 72 | 71 | 84 | 140 | 140 |
|---|---|---|---|---|---|---|---|---|
| 72 | 72 | 73 | 73 | 72 | 72 | 73 | 137 | 137 |
| 72 | 73 | 73 | 73 | 72 | 72 | 74 | 133 | 127 |
| 72 | 73 | 74 | 74 | 72 | 72 | 72 | 116 | 142 |
| 74 | 74 | 74 | 74 | 73 | 74 | 74 | 128 | 146 |

σ = LOW

FIG. 8B

| 95 | 99 | 102 | 107 | 112 | 118 | 124 | 131 | 138 | 146 |
|---|---|---|---|---|---|---|---|---|---|
| 95 | 99 | 102 | 107 | 112 | 118 | 124 | 132 | 139 | 147 |
| 95 | 99 | 102 | 108 | 112 | 118 | 125 | 132 | 139 | 147 |
| 96 | 100 | 103 | 108 | 113 | 119 | 125 | 133 | 140 | 148 |
| 98 | 100 | 103 | 108 | 113 | 119 | 126 | 133 | 140 | 148 |

FIG. 8D

| 193 | 185 | 183 | 174 | 162 | 156 | 146 | 164 | 255 | 245 |
|---|---|---|---|---|---|---|---|---|---|
| 196 | 185 | 183 | 174 | 166 | 156 | 150 | 182 | 251 | 238 |
| 193 | 188 | 183 | 172 | 164 | 156 | 151 | 199 | 244 | 220 |
| 191 | 184 | 178 | 175 | 162 | 154 | 147 | 222 | 255 | 245 |
| 197 | 189 | 181 | 175 | 162 | 159 | 150 | 245 | 255 | 252 |

σ = HIGH

FIG. 8C

| 116 | 117 | 118 | 119 | 119 | 120 | 121 | 121 | 122 | 122 |
|---|---|---|---|---|---|---|---|---|---|
| 116 | 117 | 118 | 119 | 119 | 120 | 121 | 121 | 122 | 122 |
| 116 | 117 | 118 | 119 | 119 | 120 | 121 | 121 | 122 | 122 |
| 116 | 117 | 118 | 119 | 119 | 120 | 121 | 121 | 122 | 122 |
| 116 | 117 | 118 | 119 | 119 | 120 | 121 | 121 | 122 | 122 |

FIG. 8E

| 158 | 157 | 158 | 156 | 152 | 153 | 150 | 177 | 255 | 255 |
|---|---|---|---|---|---|---|---|---|---|
| 160 | 157 | 158 | 156 | 156 | 153 | 154 | 198 | 255 | 255 |
| 158 | 159 | 158 | 156 | 154 | 153 | 156 | 217 | 255 | 255 |
| 158 | 157 | 156 | 159 | 154 | 153 | 152 | 244 | 255 | 255 |
| 163 | 161 | 158 | 159 | 154 | 157 | 156 | 255 | 255 | 255 |

TREE (DARK REGION)

BUILDING (DARK REGION)

TREE (DARK REGION)

BUILDING (DARK REGION)

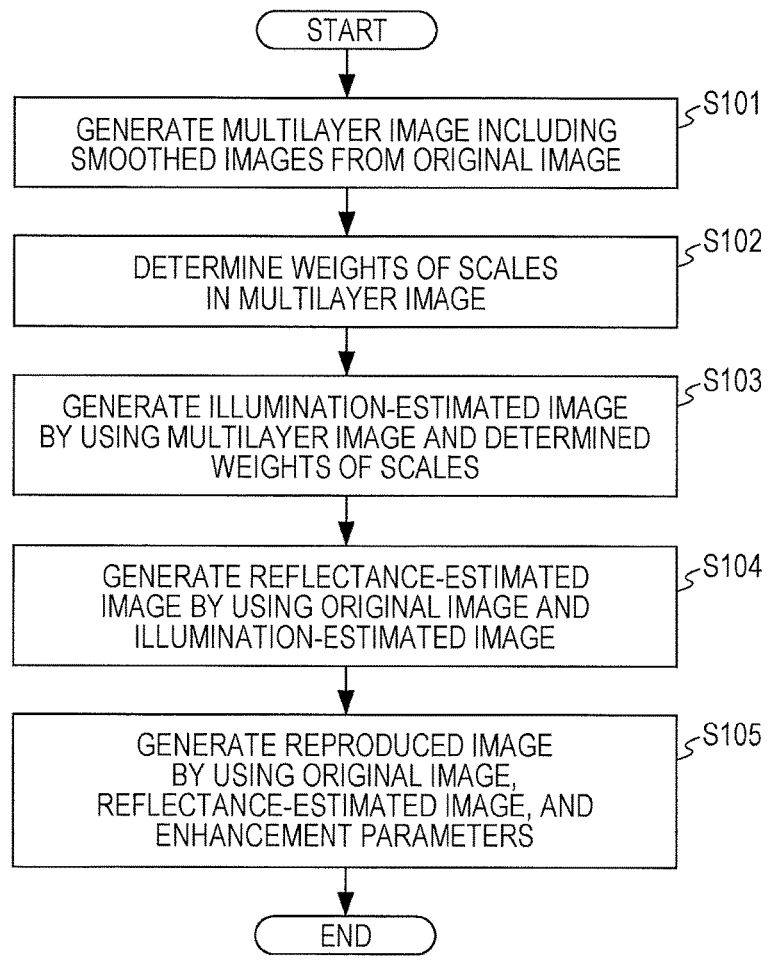

IMAGE ENHANCEMENT BASED ON THE REFLECTANCE COMPONENT

CROSS-REFERENCE TO RELATED APPLICATIONS

This application is based on and claims priority under 35 USC 119 from Japanese Patent Application No. 2015-056843 filed Mar. 19, 2015.

BACKGROUND

Technical Field

The present invention relates to an image processing apparatus, an image processing method, and a non-transitory computer readable medium.

SUMMARY

According to an aspect of the invention, there is provided an image processing apparatus including a smoothed-image generating unit, an illumination-image generating unit, a reflectance-image generating unit, and a reproduced-image generating unit. The smoothed-image generating unit generates multiple smoothed images obtained by smoothing an original image with multiple degrees of smoothing, respectively. The illumination-image generating unit generates an illumination image having pixel values of an illumination component of the original image by using the multiple smoothed images that undergo weighting in which at least one of the smoothed images is assigned a different weight. The reflectance-image generating unit generates a reflectance image on a basis of the original image and the illumination image, the reflectance image having pixel values of a reflectance component of the original image. The reproduced-image generating unit generates a reproduced image at least on a basis of the reflectance image and degree-of-enhancement information indicating a degree of enhancement of the reflectance component of the original image, the reproduced image being reproduced to enhance visibility of the original image.

BRIEF DESCRIPTION OF THE DRAWINGS

An exemplary embodiment of the present invention will be described in detail based on the following figures, wherein:

FIGS. 6A, 6B, 6C, 6D, and 6E are views illustrating an example of changes in pixel values of a part of the landscape image having undergone retinex processing;

FIGS. 8A, 8B, 8C, 8D, and 8E are views illustrating an example of changes in pixel values of a part of the landscape image having undergone retinex processing;

FIG. 21 is a flowchart illustrating an example of operation of the image processing apparatus in the exemplary embodiment of the present invention.

DETAILED DESCRIPTION

Figure 1:
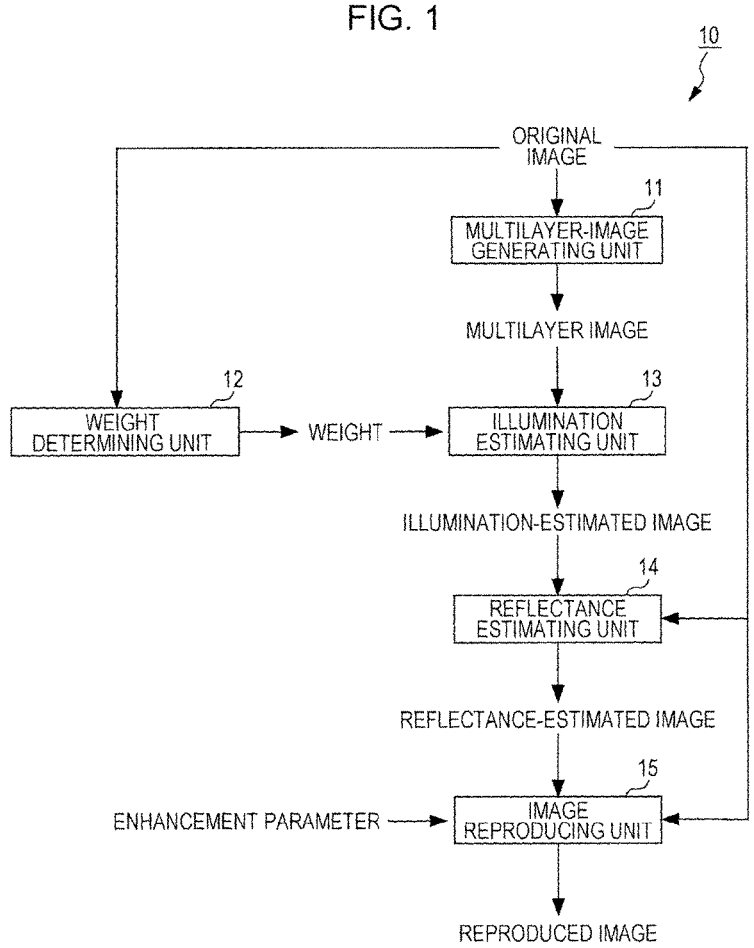
FIG. 1 is a block diagram illustrating a functional configuration example of an image processing apparatus in the exemplary embodiment of the present invention.

Hereinafter, an exemplary embodiment of the present invention will be described in detail with reference to the attached drawings.

Background of Exemplary Embodiment

When handling images to generate a document, a user of a personal computer (PC) fully utilizes the PC while viewing a monitor. Among users working in such a manner, the number of users who use an information and communication technology (ICT) device such as a tablet has rapidly and widely increased in recent years.

Generally, an office environment such as a site for office work for desktop publishing (DTP) work is not influenced much by changes in ambient light. The comfortably portable ICT device has an advantage in that a user of the ICT device may work in any place, but has a disadvantage in that the ICT device is largely influenced by the environment of the location where the ICT device is carried, such as by changes in ambient light.

The image handling work includes not only the foregoing work in which a document is generated but also work in which images taken by users with their camera-equipped tablets are stored in devices. Scenarios have been increasingly seen in which the users show the images to each other and explain situations by using the images.

Examples of characteristics of monitor usage scenarios in recent years include "easy-to-use" and "diverse location use", unlike monitor usage scenarios in the past. Since a usage or usage environment in the recent monitor usage scenarios is different from those of the monitor usage scenarios in the past, emphasis is placed on "visibility" relatively to color matching.

The term "visibility" is a characteristic indicating whether a target is clearly visible. Methods for enhancing image visibility include basic techniques in the image processing field that are represented by gamma correction, histogram equalization, dynamic range compression, and the like.

In gamma correction, a curve is generated in such a manner as to rise in a dark part or a target region and is applied to pixel values. The dark part is thereby made brighter than before. In histogram equalization, a curve is generated to make the histogram of an image even and applied to the pixel values, and the image is reproduced in such a manner that the histogram is smoothed. In dynamic range compression, a correction amount is changed in accordance with the ambient luminance of the image to thereby represent a low or high luminance without lowering the contrast.

Some methods for enhancing visibility by utilizing a visual characteristic are based on the retinex theory. In the retinex theory that is a basic principle, based on a concept in which a person uses reflectance to perceive a scene, a reflectance component is enhanced to improve visibility.

Retinex processing requires estimation of an illumination component to estimate the reflectance component. To date, an image having undergone smoothing has generally been used as the illumination component. Techniques using such a smoothed image include single-scale retinex (SSR) using a single smoothed image, multi-scale retinex (MSR) using multiple smoothed images, and integrated multi-scale retinex (IMSR). Since SSR uses a single smoothed image, a low degree of smoothing might cause noise in a dark region, and a high degree of smoothing might cause a defect in which an unnatural strip (a halo effect) appears in a boundary region between a dark region and a bright region that has a large brightness difference. In contrast, MSR and IMSR use a multilayer smoothed image and are thus believed to have reduced noise and a reduced halo effect.

However, MSR and IMSR use an illumination component synthesized by taking a simple average of the multiple smoothed images, and thus some images still have noise, a halo effect, or the like.

Hence, in the present exemplary embodiment, the weights of a multilayer smoothed image used for estimating an illumination component in retinex processing are varied in accordance with a feature amount of an image to thereby suppress occurrence of noise in a dark region, a halo effect, or the like.

Nevertheless, some users might not mind the halo effect or might accept noise to enhance contrast, for example. Although weighting based on feature amounts of an image is valuable, such a weighting method does not enable the image to be adjusted in accordance with the user preference. In recent years, the spread of tablet terminals has resulted in emphasis also being placed on easy image adjustment performed by the user in accordance with the user preference.

The present exemplary embodiment enables the weights of a multilayer smoothed image to be changed also through user interaction, thereby enabling control over the occurrence of noise in a dark region, a halo effect, or the like.

Configuration of Exemplary Embodiment

FIG. 1 is a block diagram illustrating a functional configuration example of an image processing apparatus 10 in the exemplary embodiment of the present invention. As illustrated in FIG. 1, the image processing apparatus 10 in the present exemplary embodiment includes a multilayer-image generating unit 11, a weight determining unit 12, an illumination estimating unit 13, a reflectance estimating unit 14, and an image reproducing unit 15.

The multilayer-image generating unit 11 performs processing of generating smoothed images by smoothing an original image. This is performed for estimating the reflectance in the later stage. The original image is smoothed by performing convolution expressed by, for example, the moving average method or the following Gaussian function.

$$G(x, y) = k \exp\left(-\frac{x^2 + y^2}{\sigma^2}\right) \quad (1)$$

Note that x and y denote the positions of a specific pixel, k denotes a coefficient for normalization performed to obtain a result of 1 in a case of integrating the pixel values of the filter size in image processing, and σ denotes the degree of smoothing (scale). The function described above is only an example, and any filter may be used as long as the filter results in a smoothed image. For example, a bilateral filter is usable, the bilateral filter being a filter based on a function obtained by modifying Formula 1 and being known as a smoothing filter for preserving edges.

Figure 2:
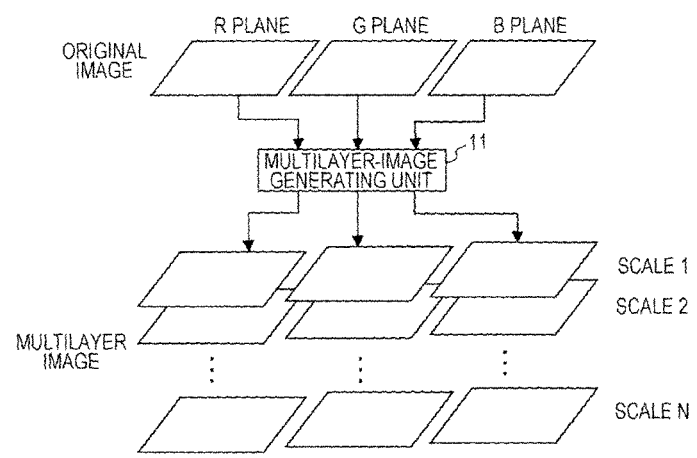
FIG. 2 is a view illustrating how a multilayer-image generating unit generates a multilayer image in a case where an original image is a red, green, and blue (RGB) image.
Figure 3A:
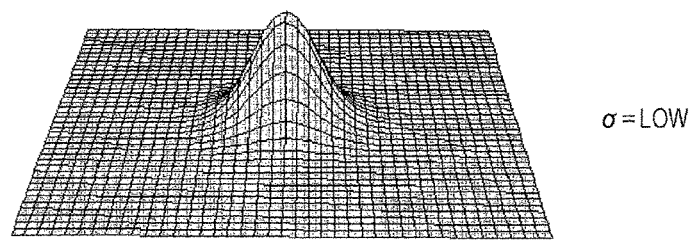
FIGS. 3A, 3B, and 3C are views illustrating image frequency variation of layers of the multilayer image, the variation depending on a value of σ.
Figure 3B:
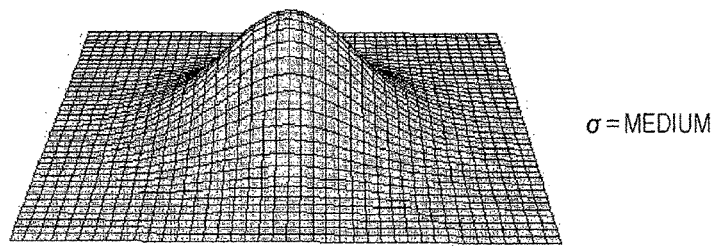
Figure 3C:
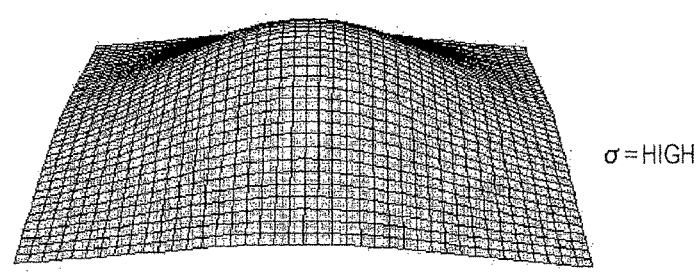

FIG. 2 illustrates how the multilayer-image generating unit 11 generates a multilayer image. FIG. 2 illustrates an example in which an image having N layers with a scale 1, a scale 2, ..., and a scale N is generated in a case where the original image is composed of three RGB planes. The layers ranging from the scale 1 to the scale N are obtained by varying the value of σ in Formula 1 and thus have different degrees of smoothing. As illustrated in FIGS. 3A to 3C, when the value of σ is varied, the frequency of the image varies. Specifically, a low value of σ leads to a high frequency as illustrated in FIG. 3A, a high value of σ leads to a low frequency as illustrated in FIG. 3C, and a medium value of σ leads to a medium frequency as illustrated in FIG. 3B.

Figure 4:
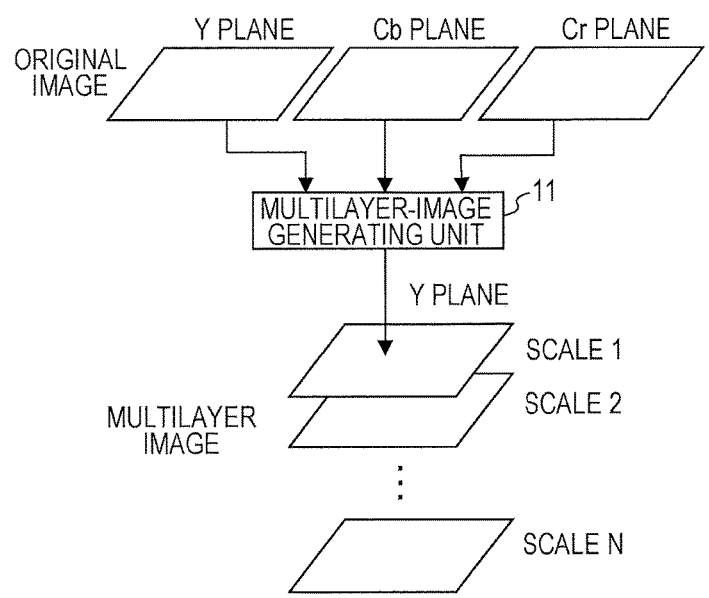
FIG. 4 is a view illustrating how the multilayer-image generating unit generates a multilayer image in a case where the original image is a luminance-chromaticity-based image.

The multilayer image may have N layers of the three RGB planes as described above but may be such an image as in FIG. 4. FIG. 4 illustrates an example in which an RGB image is in advance converted into such a luminance-chromaticity-based image as a YCbCr image. In the example, only one plane representing luminance Y is converted into a multilayer image. This is because an illumination component is estimated on the basis of only luminance in some cases. A YCbCr color space is herein used as a color space expressed using luminance chromaticity; however, an L*a*b* color space, a hue, saturation, and value (HSV) color space (H and S are converted into chromaticity coordinates), and other color spaces are also usable. When the L*a*b* color space is used, L* may be used for the luminance image. When the HSV color space is used, V may be used for the luminance image.

In the present exemplary embodiment, a multilayer image is used as an example of multiple smoothed images, and the multilayer-image generating unit 11 is provided as an example of a smoothed-image generating unit that generates the multiple smoothed images from the original image.

The weight determining unit 12 determines the weights of scales in the multilayer image. At this time, the weights of the scales are determined to be different from each other. In the present exemplary embodiment, the weight determining unit 12 is provided as an example of a setting unit that sets the weights. The weight determining unit 12 will be described in detail later.

The illumination estimating unit 13 estimates an illumination component of the original image on the basis of the multilayer image generated by the multilayer-image generating unit 11 and on the basis of the weights of the scales determined by the weight determining unit 12 (hereinafter, an image having the estimated illumination component is referred to as an "illumination-estimated image"). For example, when multiple different scales are used, the illumination component is estimated in accordance with Formula 2.

$$L(x, y) = \sum_{n=1}^{N} W_n G_n(x, y) \otimes I(x, y) \quad (2)$$

Note that L(x,y) denotes a pixel value of the illumination-estimated image, $G_n(x,y)$ denotes Formula 1 for a scale n, I(x,y) denotes a pixel value of the original image, $\otimes$ denotes convolution, and $W_n$ denotes the weight of the scale n determined by the weight determining unit 12. Note that $W_n$ satisfies the following condition.

$$\sum_{n=1}^{N} W_n = 1 \quad (3)$$

In the present exemplary embodiment, the illumination-estimated image is used as an example of an illumination image having pixel values of the illumination component of the original image, and the illumination estimating unit 13 is provided as an example of an illumination-image generating unit that generates the illumination image.

The reflectance estimating unit 14 estimates the reflectance of the original image by obtaining a ratio of a pixel value of the original image to a pixel value of the illumination-estimated image. Specifically, the reflectance estimating unit 14 obtains an image (hereinafter, referred to as a "reflectance-estimated image") expressing the reflectance as below.

$$R(x, y) = \frac{I(x, y)}{L(x, y)} \quad (4)$$

Note that R(x,y) denotes a pixel value of the reflectance-estimated image, I(x,y) denotes a pixel value of the original image, and L(x,y) denotes a pixel value of the illumination-estimated image. When the illumination-estimated image is calculated for each of the three RGB planes, it is interpreted that Formula 4 is also used to obtain R(x,y) for each of the three RGB planes. When only the illumination component (Y of YCbCr, L of L*a*b*, or V of HSV) is used, Formula 4 may be used for one plane.

In the present exemplary embodiment, the reflectance-estimated image is used as an example of a reflectance image having pixel values of the reflectance component of the original image, and the reflectance estimating unit 14 is provided as an example of a reflectance-image generating unit that generates a reflectance image.

The image reproducing unit 15 performs processing of enhancing the reflectance component on the basis of the reflectance-estimated image generated by the reflectance estimating unit 14 and the original image. For example, the image reproducing unit 15 generates a reproduced image with an enhanced reflectance component in accordance with the reproduction formula as below.

$$\hat{I}(x,y) = \alpha R(x,y) + (1-\alpha)I(x,y) \quad (5)$$

Note that $\hat{I}(x,y)$ denotes a pixel value of the reproduced image, and $\alpha$ is a parameter for the degree of enhancement and corresponds to an enhancement parameter (degree of enhancement information) in FIG. 1. In addition, $\hat{I}(x,y)$ is the reflectance component itself in the case of $\alpha=1$ and is a pixel value of the original image in the case of $\alpha=0$. In the present exemplary embodiment, $\alpha$ may take on any value from 0 to 1. In the specification, a hat symbol is disposed immediately above the letter in the formulas but is disposed next to the letter in the description.

The reproduction formula is not limited to Formula 5 and may be a formula as below.

$$\hat{I}(x,y) = \alpha \log(R(x,y)) + \beta \quad (6)$$

Note that $\alpha$ is a parameter representing a gain of the reflectance, and $\beta$ is a parameter representing an intercept of the reproduction formula. FIG. 1 illustrates the case where the image reproducing unit 15 generates a reproduced image by using the original image; however, when Formula 6 is used, the image reproducing unit 15 generates a reproduced image without using the original image. In addition, $\alpha$ corresponds to the enhancement parameter in FIG. 1, whereas $\beta$ is not illustrated in FIG. 1.

The image reproducing unit 15 uses Formula 5 or Formula 6 to reproduce an image in the present exemplary embodiment but may use any formula for enhancing the reflectance to reproduce an image.

In the present exemplary embodiment, the image reproducing unit 15 is provided as an example of the reproduced-image generating unit that generates a reproduced image.

Weight Determining Unit

The meaning of determining different weights of scales by the weight determining unit 12 will first be described.

Figure 5:
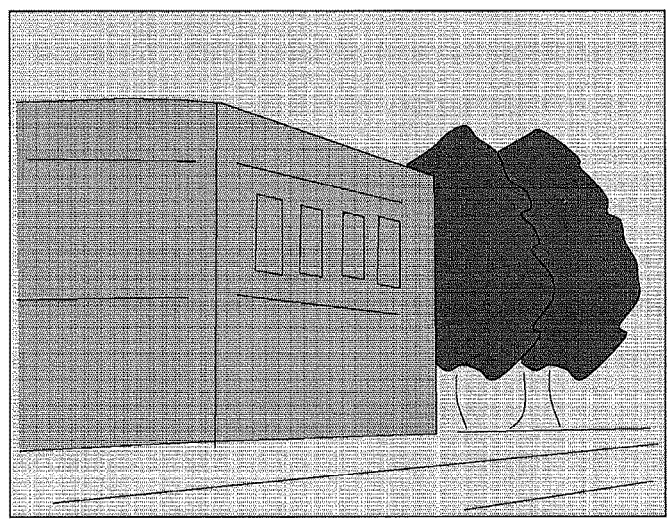
FIG. 5 is a view illustrating an example of a landscape image used for explaining the meaning of setting different weights of scales.

FIG. 5 illustrates an image including a dark and low-visibility leaves part. Suppose a case where the image undergoes retinex processing. FIGS. 6A to 6E are views illustrating an example of changes in pixel values of the leaves part in FIG. 5. In FIGS. 6A to 6E, the pixel values are expressed by using brightness values and have been normalized in such a manner that the brightest pixel takes on a value of 255. FIG. 6A illustrates distribution of pixel values (pixel distribution) in the original image. FIG. 6B illustrates pixel distribution in an illumination-estimated image obtained in a case where smoothing is performed on the original image in the pixel distribution in FIG. 6A by using a having a low value as in FIG. 3A. In this case, pixels are not influenced so much by neighboring bright pixels, and thus there is not a large difference in pixel distribution between FIG. 6A and FIG. 6B. In contrast, FIG. 6C illustrates pixel distribution in an illumination-estimated image obtained in a case where smoothing is performed on the original image in the pixel distribution in FIG. 6A by using a having a high value as in FIG. 3C. In this case, pixels are influenced by neighboring bright pixels, and the pixel distribution in FIG. 6C thus leads to brighter pixels than in the pixel distribution in FIG. 6A.

FIG. 6D illustrates pixel distribution in a reflectance-estimated image calculated on the basis of the pixel distribution in an illumination-estimated image as in FIG. 6B and the pixel distribution in FIG. 6A. FIG. 6E illustrates pixel distribution in a reflectance-estimated image calculated on the basis of the pixel distribution in an illumination-estimated image as in FIG. 6C and the pixel distribution in FIG. 6A. The pixel distribution in FIG. 6D has high pixel values and thus results in bright pixels as a whole. However, a large difference between the pixel values leads to an image with noticeable noise. In contrast, the pixel distribution in FIG. 6E leads to brighter pixels than in the pixel distribution in FIG. 6A. In addition, a smaller difference between the pixel values than that in the pixel distribution in FIG. 6D leads to a favorable image with unnoticeable noise.

Figure 7:
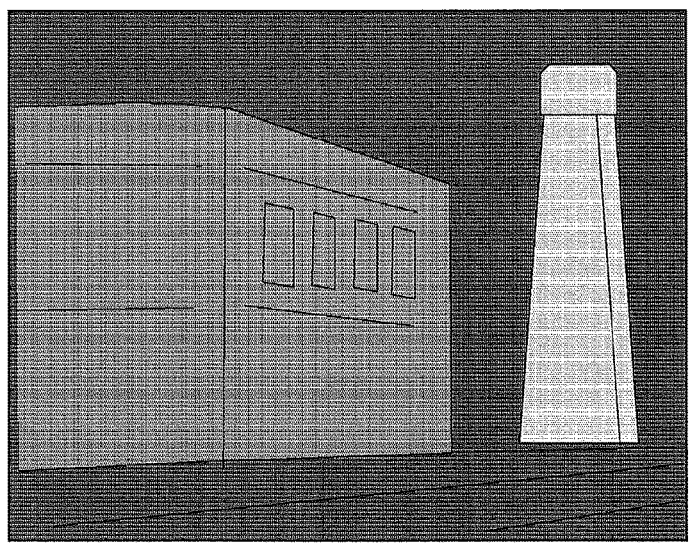
FIG. 7 is a view illustrating an example of a landscape image used for explaining the meaning of setting different weights of scales different.

FIG. 7 illustrates an image including a bright tower with a dark background. Suppose a case where the image undergoes retinex processing. FIGS. 8A to 8E are views illustrating an example of changes in pixel values of a boundary portion between the background and the tower in FIG. 7. Also in FIGS. 8A to 8E, the pixel values are expressed by using brightness values and have been normalized in such a manner that the brightest pixel takes on the value of 255. FIG. 8A illustrates distribution of pixel values in the original image. FIG. 8B illustrates pixel distribution in an illumination-estimated image obtained in a case where smoothing is performed on the original image in the pixel distribution in FIG. 8A with σ having a low value as in FIG. 3A. In this case, pixels are not influenced so much by neighboring dark pixels, and the pixel distribution in FIG. 8B thus has differences between pixels in the boundary region, like the pixel distribution in FIG. 8A. In contrast, FIG. 8C illustrates pixel distribution in an illumination-estimated image obtained in a case where smoothing is performed on the original image in the pixel distribution in FIG. 8A with σ having a high value as in FIG. 3C. In this case, pixels are influenced by neighboring dark pixels, and the pixel distribution in FIG. 8C thus has undistinguishable differences between pixels in the boundary region.

FIG. 8D illustrates pixel distribution in a reflectance-estimated image calculated on the basis of the pixel distribution in an illumination-estimated image as in FIG. 8B and the pixel distribution in FIG. 8A. FIG. 8E illustrates pixel distribution in a reflectance-estimated image calculated on the basis of the pixel distribution in an illumination-estimated image as in FIG. 8C and the pixel distribution in FIG. 8A. It is understood that FIG. 8E has a blur boundary region in which a halo effect occurs.

As understood from the above, simply averaging a multilayer image as in IMSR does not enable suppression of noise in a dark region and the halo effect in the boundary region. Thus, varying the weights of scales depending on the scene is useful.

Next, how the weight determining unit 12 determines the weights of scales will be described. Any method may be used as the method for determining weights; however, a method for determining weights in accordance with user interaction and a method for determining weights in accordance with the feature amount of an original image will herein be described.

(1) Method for Determining Weights in Accordance with User Interaction

Two methods will be described as examples of the method for determining weights in accordance with user interaction. A multilayer image having three layers corresponding to three different scales, respectively, is mentioned in the following description. A user (operator) herein gives an instruction by using his/her finger; however, the finger is only an example of an instruction unit. Any instruction unit such as a touch pen may be used as the instruction unit.

With a first one of the methods, the weights of scales are determined in accordance with the trajectory of the user instruction.

Figure 9A:
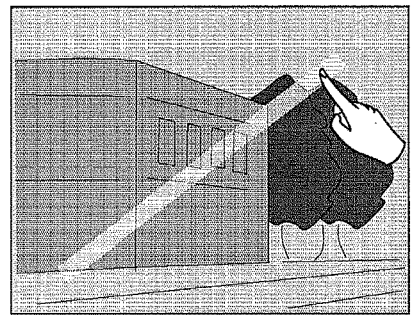
FIGS. 9A, 9B, 9C, 9D, 9E, and 9F are views and graphs that illustrate an example of a method for determining weights of scales in accordance with user interaction.
Figure 9B:

For example, the user moves his/her finger linearly to the upper right of the displayed original image as in FIG. 9A. In this case, the weight determining unit 12 judges from the finger trajectory that an instruction corresponding to a graph as illustrated in FIG. 9B is given. Specifically, in response to the finger movement to the upper right, the weight determining unit 12 increases the weight of a high scale and decreases the weight of a low scale. In addition, in response to the linear movement of the finger, the weight determining unit 12 linearly determines the weights of the highest scale to the lowest scale.

Figure 9C:
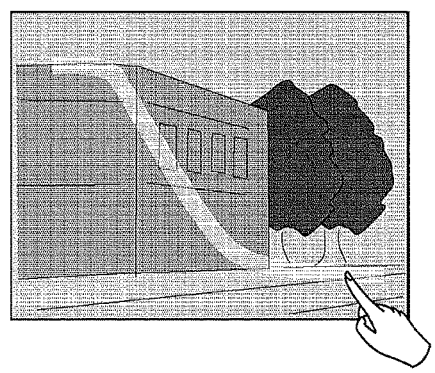
Figure 9D:
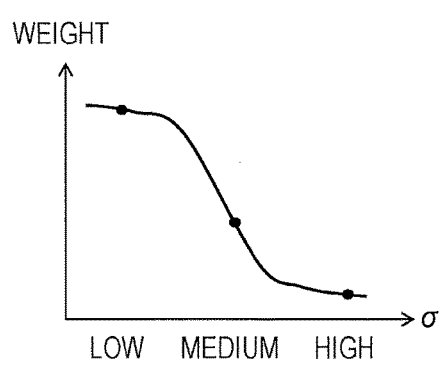

Suppose another case where the user moves his/her finger nonlinearly to the lower right of the displayed original image as in FIG. 9C. In this case, the weight determining unit 12 judges from the finger trajectory that an instruction corresponding to a graph as illustrated in FIG. 9D is given. Specifically, in response to the finger movement to the lower right, the weight determining unit 12 increases the weight of a low scale and decreases the weight of a high scale. In addition, in response to the nonlinear movement of the finger, the weight determining unit 12 determines the weights of the highest to the lowest scales on the basis of a nonlinear function. A nonlinear function having a shape close to the trajectory of the finger may be selected as a usable function from logistic functions, for example, expressed by the following formula.

$$W = \frac{1}{1 + a\exp(-b\sigma)} \tag{7}$$

Selecting this function leads to a very high weight of a low scale, a very low weight of a high scale, and a medium weight of a medium scale.

Figure 9E:
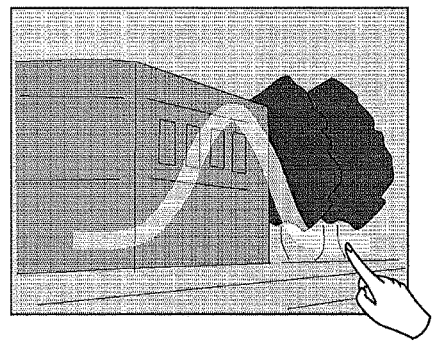
Figure 9F:
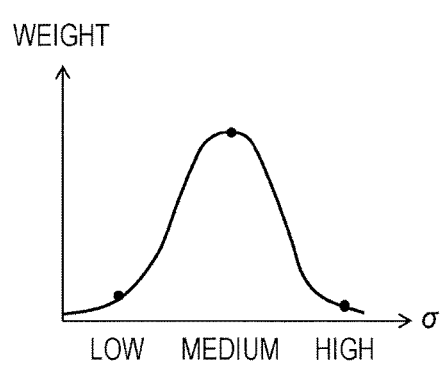

Further, the user's finger movement on the displayed original image as in FIG. 9E leads to a very high weight of a medium scale and very low weights of low and high scales as illustrated in FIG. 9F.

The weights are herein determined in such a manner that the trajectory of the user instruction is analyzed by using a graph of a relation between scales and weights; however, the determination method is not limited to this. Accordingly, the weights may be determined by performing any analysis on the trajectory of the user instruction. For example, the weights may be determined by judging, from the trajectory of the user instruction, the coordinate positions of the user's touch, a moving distance, or the like.

With a second one of the methods, the weights of scales and the enhancement parameter in FIG. 1 are determined in accordance with the combination of directions of the user instruction.

Figure 10:
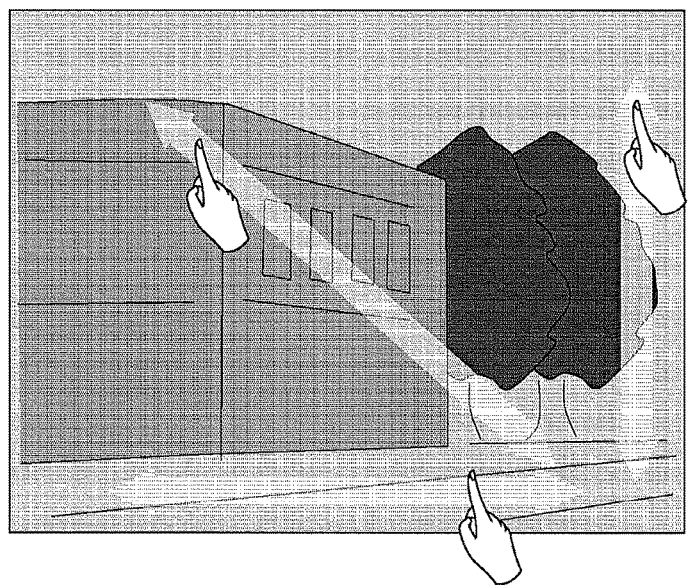
FIG. 10 is a view illustrating an example of a method for determining weights of scales in accordance with user interaction.

For example, in FIG. 10, the weights of scales are varied in response to the user's finger movement rightwards or leftwards on the displayed original image. Specifically, the user's finger movement to the left increases the weight of a low scale, and the user's finger movement to the right increases the weight of a high scale. Alternatively, a method other than the illustrated method may be employed by which tapping a lower left part increases the weight of a low scale and tapping a lower right part increases the weight of a high scale.

Also in FIG. 10, the enhancement parameter in FIG. 1 is controlled in response to upward or downward movement of the user's finger on the displayed original image. Specifically, upward movement of the user's finger increases the enhancement parameter to enhance the reflectance component, and the downward movement of the user's finger decreases the enhancement parameter not to enhance the reflectance component.

Further, in response to the user's finger movement to the upper left of the displayed original image in FIG. 10, the weights of scales and the enhancement parameter in FIG. 1 may both be controlled.

The control is herein performed on the enhancement parameter in FIG. 1 in accordance with one-time user interaction; however, this does not necessarily have to be performed. Accordingly, the second method may be interpreted as an example of determining, as the weight of a scale, a weight associated in advance with the direction or the position of the user instruction.

(2) Method for Determining Weights in Accordance with Feature Amount of Original Image Various feature amounts are conceivable as the feature amount of the original image used in this method.

Firstly, feature amounts of the entire original image include an average value of brightness of the entire original image, variation in brightness, and the like.

Secondly, feature amounts of a dark region include the degree of dark-region cohesion (degree of cohesion), the degree of dark-region noise, an average pixel value of the dark region, the area of the dark region, and the like. These feature amounts are only examples of a feature amount indicating in particular the degree of influence of the dark region on the visibility of the original image among the feature amounts of the dark region.

The degree of dark-region cohesion will be described as an example of the feature amount of the dark region.

Figure 11:
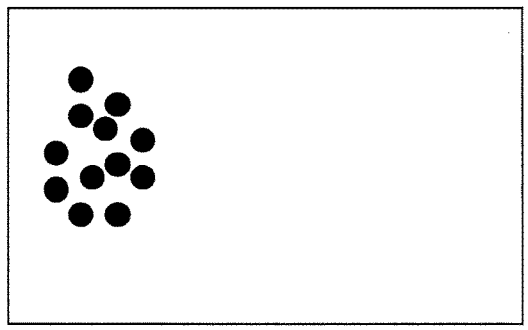
FIG. 11 is a view illustrating an example of the degree of spatial cohesion in a dark region.
Figure 12:
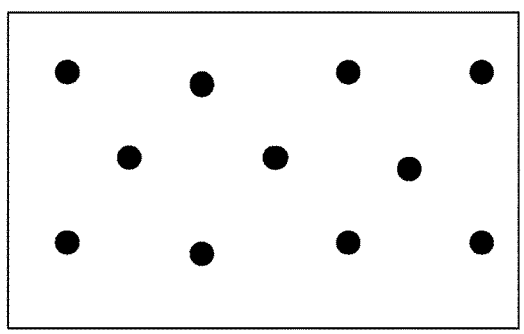
FIG. 12 is a view illustrating an example of the degree of spatial cohesion in a dark region.
Figure 13:
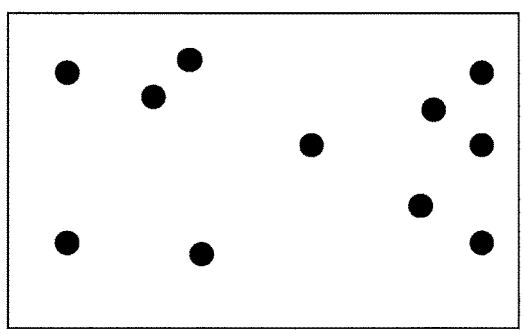
FIG. 13 is a view illustrating an example of the degree of spatial cohesion in a dark region.

FIGS. 11 to 13 each illustrate the degree of spatial cohesion in a dark region. A dark region is depicted using black dots. Examples of states of dark region distribution include clumped distribution as in FIG. 11, dispersed distribution as in FIG. 12, and random distribution as in FIG. 13. In the present exemplary embodiment, a feature amount obtained by serially quantifying the degrees of cohesion is used as an index. Examples of such a feature amount include an average nearest neighbor distance. The average nearest neighbor distance is an average value of distances between each of points and the nearest point thereto. Accordingly, a feature amount K may be obtained in accordance with the following formula by using a distance di between a point i and the point nearest to the point i and the number of points n.

$$K = \frac{1}{n}\sum_{i=1}^{n} d_i \quad (8)$$

Another conceivable feature amount is the number of points or the like in a predetermined range. However, any feature amount may be used as the index as long as the feature amount is obtained by quantifying the degree of spatial cohesion in a region.

Figure 14:
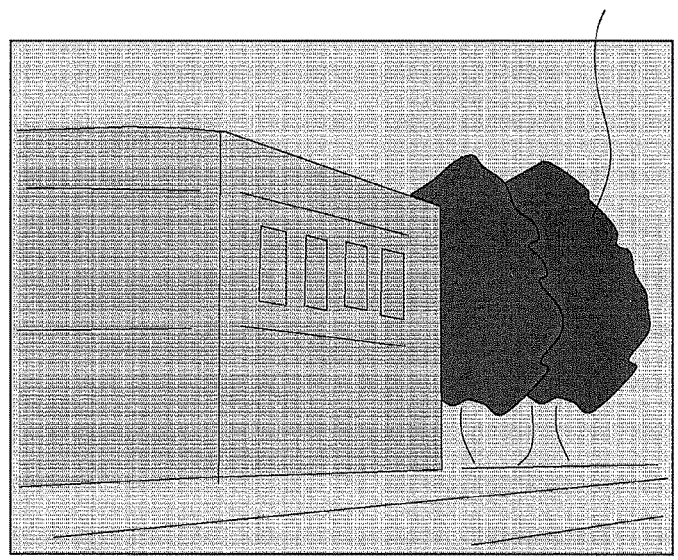
FIG. 14 is a view illustrating an example of a landscape image for explaining the degree of cohesion in a dark region (hereinafter, referred to as the degree of dark-region cohesion)
Figure 15:
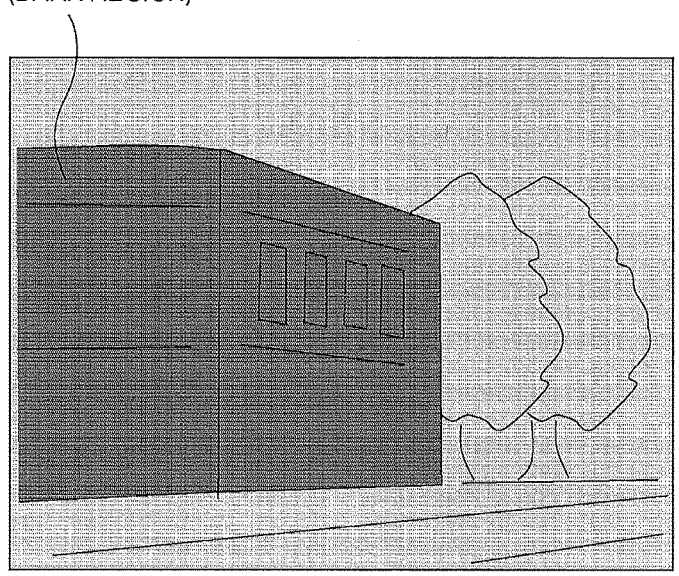
FIG. 15 is a view illustrating an example of a landscape image for explaining the degree of dark-region cohesion.
Figure 16:
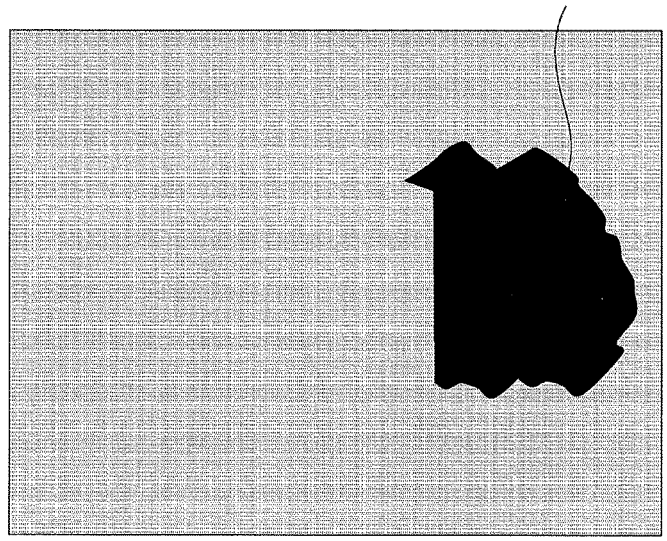
FIG. 16 is a view illustrating an example of a binary landscape image for explaining the degree of dark-region cohesion.
Figure 17:
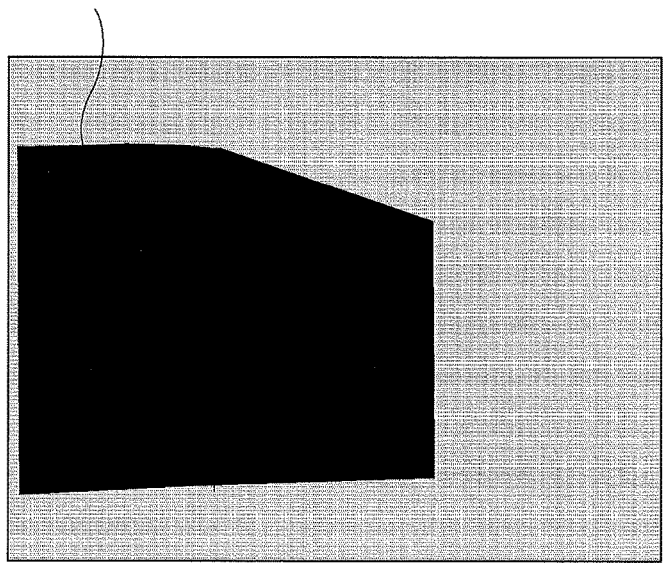
FIG. 17 is a view illustrating an example of a binary landscape image for explaining the degree of dark-region cohesion.
Figure 18:
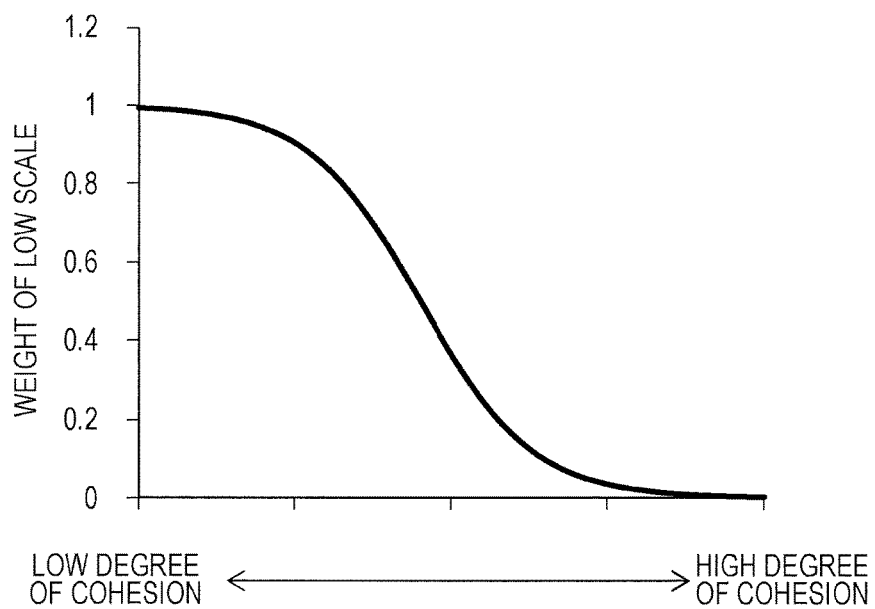
FIG. 18 is a graph illustrating an example of a function of associating the degree of cohesion with the weight of a low scale.

The degree of dark-region cohesion will be described using the degrees of dark-region cohesion in landscape images in FIGS. 14 and 15. FIGS. 14 and 15 have a tree part and a building part, respectively, that have low visibility and are thus dark regions. FIGS. 16 and 17 are binary images based on the images in FIGS. 14 and 15, respectively. In these examples, the dark region in FIG. 17 is larger and have a higher degree of coherence than the dark region in FIG. 16. Accordingly, retinex processing results in more noticeable noise in the dark region in FIG. 15 than that in FIG. 14. Hence, the weight determining unit 12 determines the weights to make the weight of a low scale of the image in FIG. 15 lower than that in the image in FIG. 14. For example, the logistic function as illustrated in FIG. 18 may be used to determine the weights in accordance with the degree of cohesion. Note that any method for obtaining a binary image such as a discrimination and analysis method may be used as long as the method enables a low-visibility dark region to be extracted.

The degree of dark-region noise will be described as another example of the feature amount of a dark region.

Since dark-region noise is noticeable in a smooth region, a feature amount is calculated for a dark smooth region that is a dark region and a smooth region.

Figure 19:
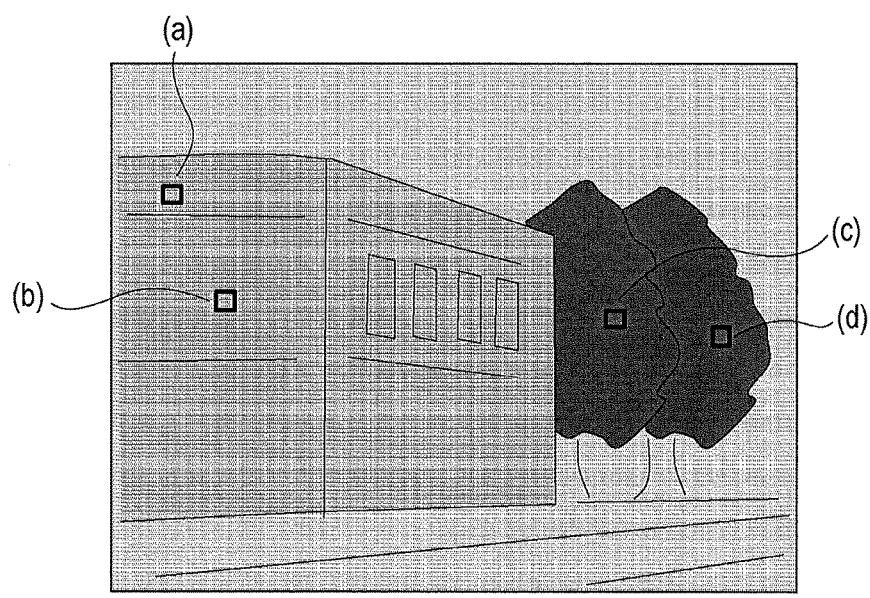
FIG. 19 is a view illustrating an example of a landscape image for explaining how to calculate the degree of dark-region noise.
Figure 20A:
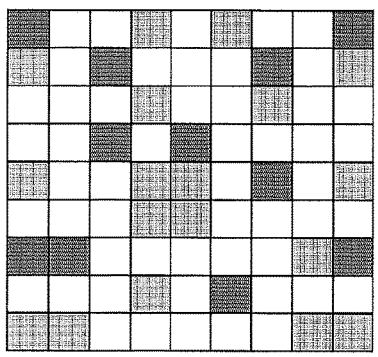
FIGS. 20A, 20B, 20C, and 20D are views each illustrating an example of the brightness of pixels at the time of enlarging a region used for calculating the degree of dark-region noise.
Figure 20B:
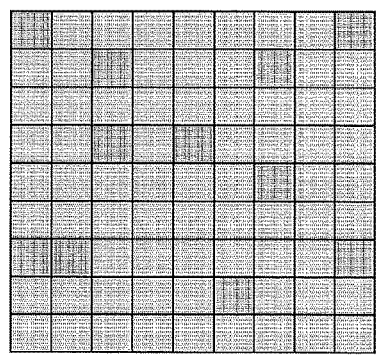
Figure 20C:
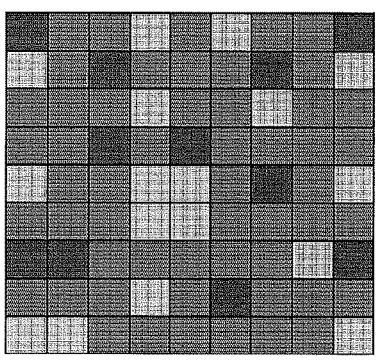
Figure 20D:
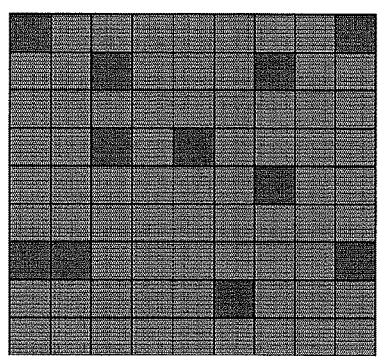

An example of the feature amount will be described using regions (a), (b), (c), and (d) in FIG. 19. The regions (a) to (d) in FIG. 19 each include a target pixel and pixels neighboring the target pixel. FIGS. 20A to 20D illustrate the brightness of the pixels at the time when the regions are enlarged. In FIGS. 20A to 20D, the lighter a color is, the brighter a pixel is. In addition, the darker a color is, the darker a pixel is. Specifically, FIGS. 20A and 20B have many bright pixels, and FIGS. 20C and 20D have many dark pixels. In addition, FIGS. 20A and 20C have a higher degree of mixture of dark and bright pixels than FIGS. 20B and 20D and thus have a larger variation in pixel value. In other words, a dark smooth region is a region in which a target pixel and neighboring pixels have many dark pixels as in FIG. 20D and which has a small variation in pixel value.

The variation in pixel value may be expressed, for example, by using a standard deviation σ in Formula 10 using an average value of μ in Formula 9 where the number of pixels in a region is M×N, and a pixel value of the position (i,j) in the region is f(i,j).

$$\mu = \frac{1}{M \times N} \sum_{j=0}^{N-1} \sum_{i=0}^{M-1} f(i, j) \quad (9)$$

$$\sigma = \sqrt{\frac{1}{M \times N} \sum_{j=0}^{N-1} \sum_{i=0}^{M-1} (f(i, j) - \mu)^2} \quad (10)$$

The weight determining unit 12 calculates the standard deviation σ of all the pixels of the original image in such a manner as to shift the target pixel one by one in the original image. If the standard deviation σ of pixels in a region is lower than a threshold, the weight determining unit 12 determines the region to be a smooth region.

In addition, if the average value μ of the pixel values in a region or the pixel value of the target pixel in the region is lower than a threshold, the weight determining unit 12 determines the region to be a dark region.

After determining the dark region and the smooth region in these manners, the weight determining unit 12 obtains, as the degree of dark-region noise, the area (the number of pixels) of the dark smooth region that is the dark region and the smooth region. Subsequently, the weight determining unit 12 determines the weights of scales on the basis of the degree of dark-region noise thus calculated.

Further, the weight determining unit 12 may determine the weights of scales on the basis of an average pixel value of the dark region (for example, a brightness average value) or the area of the dark region (for example, the number of pixels).

Still further, the weight determining unit 12 may determine the weights of scales by using multiple feature amounts. Specifically, a weight W is expressed by a linear sum obtained using $K_1, K_2, K_3, \ldots,$ and $K_n$ as feature amounts and $b_1, b_2, b_3, \ldots,$ and $b_n$ as coefficients as below.

$$W = \sum_{i=1}^{n} (b_i \times K_i) \quad (11)$$

The weight W is not limited to such a linear sum and may be determined using any function.

The weight determination methods as described above are each only an example of a method by which weights are determined in such a manner that the weight of a smoothed image smoothed with a low degree of smoothing is decreased as the feature amount of a dark region becomes large. However, this may be interpreted as an example of a method by which weights are determined in such a manner that in a case where the feature amount of a dark region is larger than a predetermined threshold, the weight of a smoothed image smoothed with a low degree of smoothing is decreased as the degree of smoothing used for the smoothed image becomes low. Alternatively, this may be interpreted as an example of a method by which weights are determined in such a manner that the weight of a smoothed image smoothed with a lower degree of smoothing than a predetermined threshold is decreased as the feature amount of a dark region becomes large.

Thirdly, the feature amounts of a bright region include the degree of bright-region cohesion (the degree of cohesion), an average pixel value of the bright region (for example, an average value in brightness), the area of the bright region (for example, the number of pixels), and the like. These feature amounts are only examples of a feature amount indicating in particular the degree of influence of the bright region on the visibility of the original image among the feature amounts of the bright region.

As understood from FIGS. 8A to 8E, performing smoothing with an increased scale might cause a so-called "whiteout" in a brighter region than the other regions. In the whiteout, saturation of a pixel value causes a pixel to be whited out. Accordingly, the weight determining unit 12 decreases the weight of a high scale in accordance with the degree of cohesion, the average pixel value, the area, or the like, as in the case of the dark region.

The weight determination method as described above is only an example of a method by which weights are determined in such a manner that the weight of a smoothed image smoothed with a high degree of smoothing is decreased as the feature amount of a bright region becomes large. However, this may be interpreted as an example of a method by which weights are determined in such a manner that in a case where the feature amount of a bright region is larger than a predetermined threshold, the weight of a smoothed image is decreased as the degree of smoothing used for the smoothed image becomes high. Alternatively, this may be interpreted as an example of a method by which weights are determined in such a manner that the weight of an image smoothed with a higher degree of smoothing than the predetermined threshold is decreased as the feature amount of a bright region becomes large.

Fourthly, both the feature amount of a dark region and the feature amount of a bright region may be used. If both the feature amount of a dark region and the feature amount of a bright region are larger than the respective predetermined thresholds, noise in the dark region and a whiteout are likely to occur. Accordingly, the weights of low and high scales are decreased.

The weight determination method as described above is only an example of a method by which weights are determined in such a manner that in a case where the feature amounts of dark and bright regions are each larger than a corresponding one of predetermined thresholds, a smoothed image with a low degree of smoothing and a smoothed image smoothed with a high degree of smoothing each have a low weight. Specifically, for a smoothed image smoothed with a low degree of smoothing, the weight thereof is decreased as the degree of smoothing used for the smoothed image becomes low. For a smoothed image smoothed with a high degree of smoothing, the weight thereof is decreased as the degree of smoothing used for the smoothed image becomes high.

Fifthly, the brightness difference described with reference to FIGS. 8A to 8E may be considered as the feature amount of a particular region. Since an image exhibiting a large difference in brightness between pixels is likely to have a halo effect, the weight of a high scale is decreased. Note that the standard deviation or the like of pixels in a local region of an image, instead of the entire image, may be used as the brightness difference.

The weight determination method as described above is only an example of a method by which weights are determined in such a manner that in a case where a feature amount regarding the brightness difference in a boundary between a dark region and a bright region is larger than a predetermined threshold, a smoothed image smoothed with a high degree of smoothing has a low weight. Specifically, the weight may be determined in such a manner that the weight of a smoothed image smoothed with a high degree of smoothing is decreased as the degree of smoothing used for the smoothed image becomes high.

As described above, the weights of scales are varied in accordance with the feature amount of the original image, and thereby noise in a dark region, a halo effect, and the like are suppressed.

Operation in Exemplary Embodiment

FIG. 21 is a flowchart illustrating an example of operation of the image processing apparatus 10 in the exemplary embodiment of the present invention.

Upon receiving an original image, the multilayer-image generating unit 11 first generates a multilayer image including multiple images smoothed from the original image as illustrated in FIGS. 2 and 4 (step 101). Also as described with reference to FIGS. 9A to 20D, the weight determining unit 12 determines the weights of scales in the multilayer image in accordance with user interaction or the feature amount of the original image (step 102). Note that steps 101 and 102 are herein performed in this order but may be performed in any order. Steps 101 and 102 may also be performed in parallel.

The illumination estimating unit 13 generates an illumination-estimated image by using the multilayer image including multiple smoothed images that are generated in step 101 and assigned the weights determined in step 102 (step 103).

The reflectance estimating unit 14 generates a reflectance-estimated image on the basis of the original image and the illumination-estimated image generated in step 103 (step 104).

The image reproducing unit 15 generates a reproduced image on the basis of the original image, the reflectance-estimated image generated in step 104, and the enhancement parameters (step 105). Note that the original image is herein used on the assumption that the reproduced image is generated using Formula 5. However, in a case where the reproduced image is generated using Formula 6, the original image does not have to be used in step 105.

Modification

In the present exemplary embodiment, the weight determining unit 12 determines the weights of scales in accordance with user interaction on the original image or the feature amount of the original image, the weight determination method is not limited to this.

For example, the weight determining unit 12 may determine the weights in such a manner as to readjust the weights of scales in accordance with user interaction on the reproduced image. Such a configuration enables the user to perform fine adjustment on the weights of scales, and a reproduced image with higher visibility is obtained than in the case where readjustment is not performed.

In addition, the weight determining unit 12 may be divided into two. A first weight determining unit 12 determines the weights of scales in accordance with the feature amount of the original image, and a second weight determining unit 12 determines the weights of scales in accordance with user interaction on the reproduced image. Specifically, the first weight determining unit 12 first determines the weights of scales in accordance with the feature amount of the original image to thereby obtain a high-visibility reproduced image. Subsequently, the second weight determining unit 12 performs fine adjustment on the obtained reproduced image in accordance with the user instruction. With such a configuration, the user only has to perform fine adjustment. Accordingly, a higher-visibility reproduced image is obtained easily.

Hardware Configuration of Image Processing Apparatus

The image processing apparatus 10 in the present exemplary embodiment may be implemented, for example, by image processing software installed on a PC, but is typically implemented as the image processing apparatus 10 that performs image reading and image forming.

Figure 22:
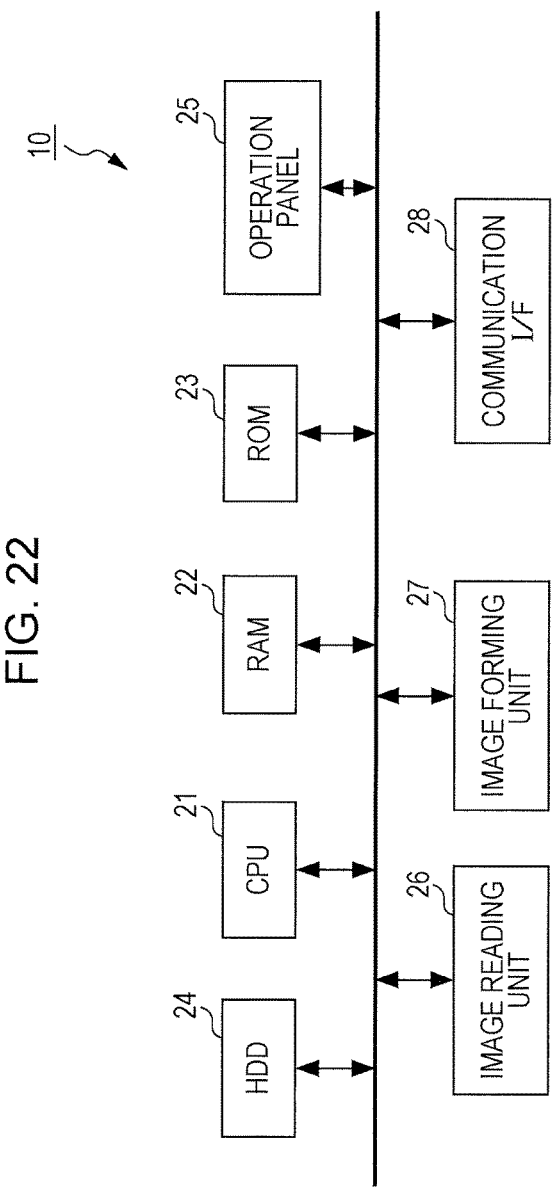
FIG. 22 is a block diagram illustrating a hardware configuration example of the image processing apparatus in the exemplary embodiment of the present invention.

FIG. 22 is a view illustrating a hardware configuration example of the image processing apparatus 10 as described above. As illustrated in FIG. 22, the image processing apparatus 10 includes a central processing unit (CPU) 21, a random access memory (RAM) 22, a read only memory (ROM) 23, a hard disk drive (HDD) 24, an operation panel 25, an image reading unit 26, an image forming unit 27, and a communication interface (hereinafter, referred to as a "communication I/F") 28.

The CPU 21 implements functions (described later) by loading various programs stored in the ROM 23 and the like into the RAM 22 and executing the programs.

The RAM 22 is a memory used as a work memory for the CPU 21.

The ROM 23 is a memory used for storing the various programs and the like executed by the CPU 21.

The HDD 24 is, for example, a magnetic disk device that stores image data read by the image reading unit 26, image data used for image forming by the image forming unit 27, and the like.

The operation panel 25 is a touch panel that receives input through a user operation. The operation panel 25 includes a display on which various pieces of information are displayed and a position detection sheet on which the position of an instruction given using the user's finger, a stylus, or the like is detected.

The image reading unit 26 reads images recorded on a recording medium such as paper. The image reading unit 26 is, for example, a scanner. A scanner using charge coupled devices (CCD) or a contact image sensor (CIS) may be used. The CCD scanner receives light in such a manner that light is radiated from a light source onto a document to be reflected and the reflected light is reduced through lenses. The CIS scanner receives light radiated in series from a light emitting diode (LED) light source onto a document.

The image forming unit 27 forms an image on the recording medium. The image forming unit 27 is, for example, a printer. A printer using an electrophotographic system or an inkjet system may be used. The electrophotographic printer forms an image by transferring toner attached to a photoconductor onto the recording medium. The inkjet printer forms an image on the recording medium by jetting ink onto the recording medium.

The communication I/F 28 transmits and receives various pieces of information to and from another device through a network.

A program implementing the present exemplary embodiment is provided not only by using a communication unit or a recording medium such as a compact disc-(CD-)ROM storing the program therein.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing method comprising:
    generating a plurality of smoothed images obtained by smoothing an original image with a plurality of degrees of smoothing, respectively;
    generating an illumination image having pixel values of an illumination component of the original image by using the plurality of smoothed images that undergo weighting in which at least one of the smoothed image is assigned a different weight, wherein the weighting is set so that a weight for one of the smoothed images, which is smoothed with a degree of smoothing higher than a predetermined level, is lower when a feature amount indicating a degree of influence of a bright region of the one smoothed image on visibility of the one smoothed image is higher;
    generating a reflectance image on a basis of the original image and the illumination image, the reflectance image having pixel values of a reflectance component of the original image; and generating a reproduced image at least on a basis of the reflectance image and degree-of-enhancement information indicating a degree of enhancement of the reflectance component of the original image, the reproduced image being reproduced to enhance visibility of the original image.

2. An image processing apparatus comprising:
a smoothed-image generating unit that generates a plurality of smoothed images obtained by smoothing an original image with a plurality of degrees of smoothing, respectively;
a setting unit that sets weighting such that a weight for one of the smoothed images, which is smoothed with a degree of smoothing lower than a first predetermined level, is lower when a first feature amount indicating a degree of influence of a dark region of the one smoothed image on visibility of the one smoothed image is higher;
an illumination-image generating unit that generates an illumination image having pixel values of an illumination component of the original image by using the plurality of smoothed images that undergo the weighting in which at least one of the smoothed images is assigned a different weight;
a reflectance-image generating unit that generates a reflectance image on a basis of the original image and the illumination image, the reflectance image having pixel values of a reflectance component of the original image; and
a reproduced-image generating unit that generates a reproduced image at least on a basis of the reflectance image and degree-of-enhancement information indicating a degree of enhancement of the reflectance component of the original image, the reproduced image being reproduced to enhance visibility of the original image.

3. The image processing apparatus according to claim 2, wherein:
the setting unit sets the weighting such that a weight for another one of the smoothed images, which is smoothed with a degree of smoothing higher than a second predetermined level, is lower as a second feature amount indicating a degree of influence of a bright region of said another one smoothed image on the visibility of said another one smoothed image is higher.

4. The image processing apparatus according to claim 2, wherein:
the setting unit sets the weighting such that a weight for the one of the smoothed images, which is smoothed with a degree of smoothing lower than the first predetermined level, and a weight for another one of the smoothed images, which is smoothed with a degree of smoothing higher than a second predetermined level, are both lower than a predefined weight in a case where the first feature amount and a second feature amount indicating a degree of influence of a bright region of said another one smoothed image on the visibility of said another one smoothed image are each larger than a respective one of predetermined thresholds.

5. The image processing apparatus according to claim 2, wherein:
the setting unit sets the weighting such that a weight for another one of the smoothed images, which is smoothed with a degree of smoothing higher than a second predetermined level, is lower than a predefined weight in a case where a second feature amount that is a difference in brightness between a dark region and a bright region of the another one smoothed image is larger than a predetermined threshold.

6. The image processing apparatus according to claim 2, wherein the illumination-image generating unit generates the illumination image by using the plurality of smoothed images that undergo the weighting by which at least one of noise, a whiteout, or a halo effect is suppressed, the noise appearing in a dark region of the reproduced image having a brightness below a predetermined threshold, the whiteout appearing in a bright region of the reproduced image having a brightness above a predefined threshold, the halo effect appearing on a boundary between the dark region and the bright region of the reproduced image.

7. A non-transitory computer readable medium storing a program causing a computer to execute a process comprising:
generating a plurality of smoothed images obtained by smoothing an original image with a plurality of degrees of smoothing, respectively;
generating an illumination image having pixel values of an illumination component of the original image by using the plurality of smoothed images that undergo weighting in which at least one of the smoothed image is assigned a different weight, wherein the weighting is set so that a weight for one of the smoothed images, which is smoothed with a degree of smoothing lower than a first predetermined level, and a weight for another one of the smoothed images, which is smoothed with a degree of smoothing higher than a second predetermined level, are both lower than a predefined weight in a case where a feature amount indicating a degree of influence of a dark region of the one smoothed image on visibility of the one smoothed image and a feature amount indicating a degree of influence of a bright region of the another one smoothed image on the visibility of the another one smoothed image are each larger than a respective one of predetermined thresholds;
generating a reflectance image on a basis of the original image and the illumination image, the reflectance image having pixel values of a reflectance component of the original image; and
generating a reproduced image at least on a basis of the reflectance image and degree-of-enhancement information indicating a degree of enhancement of the reflectance component of the original image, the reproduced image being reproduced to enhance visibility of the original image.

* * * * *